June 11, 1935.  B. C. EVANS  2,004,784

BUSHING

Filed Dec. 13, 1933

Inventor:
Bernard C. Evans,
by Harry E. Dunham
His Attorney.

Patented June 11, 1935

2,004,784

UNITED STATES PATENT OFFICE 2,004,784

BUSHING

Bernard C. Evans, Fort Wayne, Ind., assignor to General Electric Company, a corporation of New York Application December 13, 1933, Serial No. 702,185

2 Claims. (Cl. 22—202)

My invention relates to bushings and more particularly to means for securing a bushing in an opening in a casing for electrical apparatus such as a transformer. The bushing should be firmly secured in place and in many cases, particularly for outdoor service, the bushing should be sealed into the opening in the casing to prevent entrance of moisture. The general object of the invention is to provide an improved method for securing the bushing in place.

Figure 1:
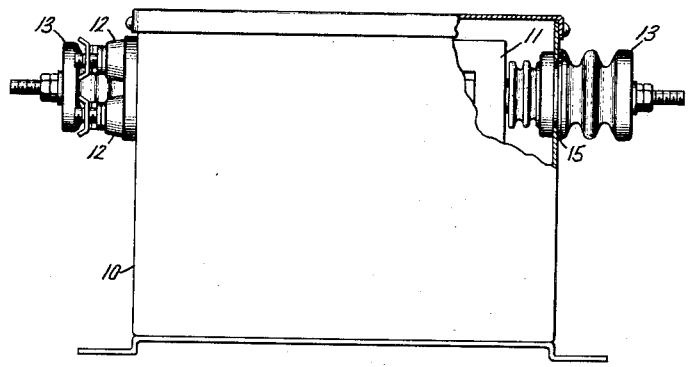
Figure 2:
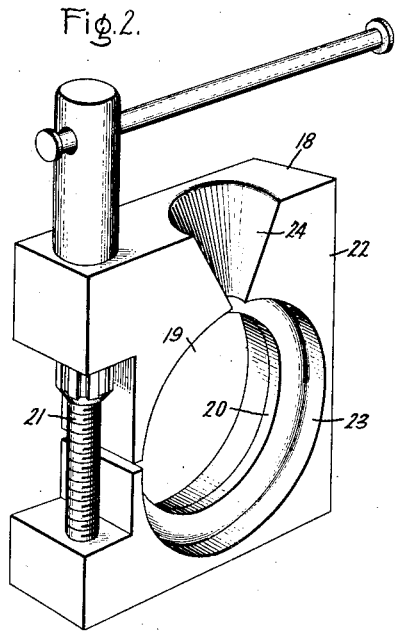
Figure 3:
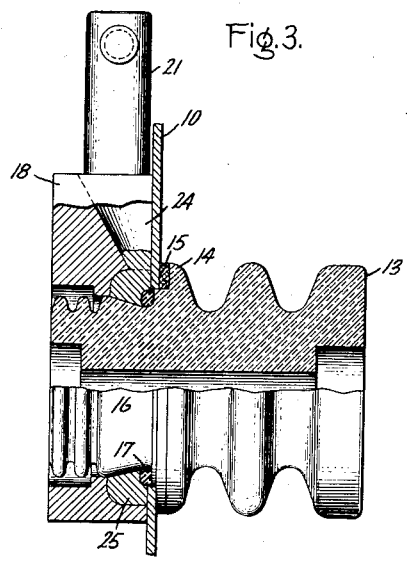

The invention will be better understood from the following description taken in connection with the accompanying drawing in which Fig. 1 shows a transformer casing partly broken away to show a bushing secured in an opening in the casing in accordance with the invention, Fig. 2 is a perspective view of a mold used in the process of securing the bushing in place, and Fig. 3 is an enlarged view of the bushing, partly in section, together with a fragment of the casing and a section of the mold.

Like reference characters indicate similar parts in the different figures of the drawing.

The metal casing 10 shown in the drawing contains electrical apparatus shown as a transformer 11. The transformer windings are connected to outside terminals through a pair of low voltage bushings 12 and a pair of high voltage bushings 13 secured in openings in the casing 10. Each of the bushings 13 is held in place through an opening in the casing 10 as shown in Figs. 1 and 3. The bushing is formed of suitable insulating material such as porcelain. A shoulder 14 between the inner and outer ends of the bushing fits against a gasket 15 on the outer surface of the casing 10 and surrounding the opening therein. The section of the bushing between its inner end and the shoulder 14 is slightly smaller than the opening in the casing so that it will readily enter the opening. The outer surface of the bushing near the shoulder 14 is tapered outwardly toward the inner end of the bushing, this tapered surface 16 forming an acute angle with the inner surface of the casing 10.

The bushing is first placed in position with its inner reduced section extending through the opening in the casing and the gasket 15 tightly compressed between the casing and the shoulder 14 of the bushing. A ring or band 17 of organic material such as rubber or paper, the purpose of which will appear later, is then preferably placed around the bushing at the base of its tapered surface 16 and close to the joint between the bushing and the edge of the opening in the casing. A suitable mold 18, which may be of the form shown in Fig. 3, is next clamped around the inner end of the bushing and tight against the inner surface of the casing 10. The mold 18 as shown in Fig. 2 is a block of metal having an opening 19 with a restricted portion 20 approximately fitting the bushing 13 at the larger end of its tapered surface 16. The mold 18 is split at one side and may be expanded or contracted by means of a screw 21. The mold is placed over the inner end of the bushing while the mold is expanded, the face 22 of the mold being smooth and flat to fit tightly against the inner surface of the casing 10 around the bushing. The mold is then contracted by means of the screw 21 to clamp the mold and bushing securely in place. The opening 19 through the mold has an enlarged portion 23 between its restricted portion 20 and its face 22 so that when the mold is in position on the bushing a space or cavity is formed between the tapered surface 16 of the bushing, the inner surface of the casing 10 and the surface of the enlarged part 23 of the opening 19 in the mold. An opening 24 extends through the top of the mold from the enlarged portion 23 of its opening 19.

With the bushing 13 and mold 18 tightly clamped in place, a suitable molten metal is poured through the opening 24 of the mold to form when cooled an integral cast metal ring 25 in the enlarged part 23 of the opening 19 in the mold. The mold is expanded and removed after the cast ring 25 has cooled and become solid. The cast clamping ring 25 should be of some metal which will contract considerably as it cools and which is fairly strong mechanically so that it will grip the bushing tightly. Babbitt metal has been found to be very satisfactory and other metals such as hard solder also give good results. Such metals have fairly low melting points which is also an advantage as it is desirable that the bushing and the gasket 15 be subjected to no more heat than is necessary.

The contraction of the metal ring 25 as it cools produces a wedging action between the inner surface of the casing 10 and the tapered surface 16 of the bushing and this tends to force these surfaces further apart. The tapered surface 16 of the bushing preferably has a smooth finish so that it may slide or slip with respect to the ring 25 and the bushing be drawn tightly into place by the pressure of the ring.

When the molten metal which is to form the clamping ring 25 is poured into the mold 18, the ring 17 of rubber, paper or other organic material prevents the metal from flowing to the base of the tapered surface 16 of the bushing where it might reduce the effect of the wedging action of the metal ring 25. The organic ring 17 is not only somewhat compressible but it is usually burned away to some extent by the heated metal and so does not interfere with the wedging action of the metal ring 25 as it cools and contracts. The organic ring 17, while considered desirable for the best results, may be omitted however if found unnecessary as good results have been obtained without it.

The invention has been explained by describing and illustrating a particular bushing and the means and method for securing it in place but it will be obvious that changes may be made without departing from the spirit of the invention and the scope of the appended claims.

What I claim as new and desire to secure by Letters Patent of the United States is:

1. The method of securing a bushing in an opening in an electrical apparatus casing, said bushing having a shoulder adjacent the outer surface of the casing and a surface adjacent to and tapered at an acute angle with the inner surface of the casing, said method including the casting of an integral metal ring around said bushing and between said surfaces of the bushing and casing.

2. The method of securing a bushing in an opening in an electrical apparatus casing, said bushing having a shoulder adjacent the outer surface of the casing and a surface adjacent to and tapered at an acute angle with the inner surface of the casing, said method including placing an organic ring around the bushing at the base of its tapered surface, and casting an integral metal ring around said bushing and between said surfaces of the bushing and casing.

BERNARD C. EVANS.